(12) United States Patent
Malko et al.

(10) Patent No.: US 9,159,043 B2
(45) Date of Patent: Oct. 13, 2015

(54) ENTERPRISE PRODUCT MANAGEMENT SYSTEM AND METHOD

(75) Inventors: Pierre Malko, Arlington, VA (US); John Charles Gilbert, Arlington, VA (US)

(73) Assignee: Dante Consulting, Inc., Arlington, VA (US)

(*) Notice: Subject to any disclaimer, the term of this patent is extended or adjusted under 35 U.S.C. 154(b) by 330 days.

(21) Appl. No.: 13/467,467

(22) Filed: May 9, 2012

(65) Prior Publication Data

US 2012/0290523 A1 Nov. 15, 2012

Related U.S. Application Data

(60) Provisional application No. 61/484,664, filed on May 10, 2011.

(51) Int. Cl.
*G06Q 10/00* (2012.01)
*G06Q 10/06* (2012.01)

(52) U.S. Cl.
CPC ............ *G06Q 10/0633* (2013.01); *G06Q 10/06* (2013.01)

(58) Field of Classification Search
CPC .......................... G06Q 10/06; G06Q 10/0633
USPC ........................................................ 705/7.27
See application file for complete search history.

(56) References Cited

U.S. PATENT DOCUMENTS

| | | | |
|---|---|---|---|
| 5,446,895 A | 8/1995 | White et al. | |
| 5,548,506 A | 8/1996 | Srinivasan | |
| 5,826,252 A | 10/1998 | Wolters, Jr. et al. | |
| 5,844,554 A * | 12/1998 | Geller et al. | 715/744 |
| 5,860,007 A | 1/1999 | Soni et al. | |
| 6,049,665 A * | 4/2000 | Branson et al. | 717/108 |
| 6,341,291 B1 | 1/2002 | Bentley et al. | |
| 6,470,343 B1 | 10/2002 | O'Brien et al. | |
| 6,487,713 B1 * | 11/2002 | Cohen et al. | 717/105 |
| 6,671,818 B1 * | 12/2003 | Mikurak | 714/4.21 |
| 6,957,186 B1 | 10/2005 | Guheen et al. | |
| 2002/0052807 A1 * | 5/2002 | Han et al. | 705/27 |
| 2003/0055659 A1 | 3/2003 | Alling | |
| 2003/0061330 A1 | 3/2003 | Frisco et al. | |
| 2004/0019900 A1 | 1/2004 | Knightbridge et al. | |
| 2005/0065938 A1 * | 3/2005 | Dorow et al. | 707/100 |
| 2005/0283410 A1 * | 12/2005 | Gosko | 705/27 |
| 2007/0265926 A1 | 11/2007 | Ohmann et al. | |
| 2008/0263052 A1 | 10/2008 | Parsell et al. | |
| 2008/0288889 A1 * | 11/2008 | Hunt et al. | 715/810 |
| 2009/0259683 A1 * | 10/2009 | Murty | 707/103 R |
| 2010/0179847 A1 | 7/2010 | Cope et al. | |
| 2011/0137862 A1 * | 6/2011 | Kamimura | 707/624 |
| 2011/0154302 A1 * | 6/2011 | Balko et al. | 717/140 |
| 2012/0005179 A1 * | 1/2012 | Thimmel et al. | 707/705 |
| 2012/0047045 A1 * | 2/2012 | Gopikrishna et al. | 705/26.5 |
| 2013/0085799 A1 * | 4/2013 | Zhang et al. | 705/7.26 |

* cited by examiner

*Primary Examiner* — Alan S Miller
*Assistant Examiner* — Folashade Anderson
(74) *Attorney, Agent, or Firm* — Lieberman & Brandsdorfer, LLC

(57) ABSTRACT

A comprehensive enterprise product management system to effectuate efficient product time to market. The system includes a process model and a data model. The process model consists of entities that represent typical concepts in a trade setting and relationships among these entities. The data model represents the complexity of a product, including defining the entities that comprise the product and the relationship among these entities. The process model and the data model accommodate the dynamic characteristics associated with both product definition and channels of trade.

54 Claims, 15 Drawing Sheets

ENTERPRISE PRODUCT MANAGEMENT SYSTEM AND METHOD

CROSS REFERENCE TO RELATED APPLICATION(S)

This application is a non-provisional patent application claiming the benefit of the filing date of U.S. Patent Application Ser. No. 61/484,664 filed on May 10, 2011 and titled "Enterprise Product Management System and Method", which is hereby incorporated by reference.

BACKGROUND

The invention relates to a product and system employed for enterprise product management. More specifically, the invention relates to a comprehensive system in the form of an integrated solution that effectuates efficient product time to market.

SUMMARY OF THE INVENTION

This invention comprises a product management platform to drive dynamic behavior for workflow, user experience, and system integration.

In one aspect, a system is provided to support the product management platform. Metadata and rules are utilized in the system to drive the dynamic behavior. The system includes a processor in communication with memory, and a functional unit in communication with the memory. The functional unit includes tools to support the functionality of the system. More specifically, the tools include, but are not limited to, a core model, an extension entity, a model rule manager, a director, and a presentation manager. The core model operates at a management level and includes at least one core entity to provide a common view of entities in an enterprise. One or more extension entities are provided to communicate with the core model. More specifically, each extension entity in the system supports an extended functionality of the core model while a defined functionality of the core model remains constant. The model rule manager is provided to establish at least one rule that defines a relationship between the core model and the model extension entity. Each model rule defines one or more conditions under which the model extension entity applies to the core model. A director is provided in communication with the model rule manager. The director functions to filter model rules and to establish a relationship between the extension entity and the core model. The director may take the form of a rule engine or an expression language processor. A presentation manager is provided in communication with the director. The presentation manager functions to create an integrated system through integration of the model extension entity with the core model. More specifically, the presentation manager provides a customized view of the core model, including the defined relationship between the core model and the extension entity.

In another aspect, a system is provided to support the product management platform. Metadata and rules are utilized in the system to drive the dynamic behavior. The system includes a processor in communication with memory, and a functional unit in communication with the memory. The functional unit includes tools to support the functionality of the system. More specifically, the tools include, but are not limited to, a core workflow manager, an integration adapter, an integration rule manager, a director, and an integration manager. The core workflow manager is in communication with the processor and operates at a management level. The core workflow manager includes a common set of workflows that automate common processes in an enterprise. One or more integration adapters are provided to communicate with the workflow to support integration with an external system, and at the same time the functionality of the workflow remains constant. The integration rule manager is provided to establish one or more rules to define a relationship between the integration adapter and a workflow step. Each rule defines one or more conditions under which the integration adapter is set to be invoked. The director is provided in communication with the rule manager. The director filters the model rules and establishes a relationship between the integration adapter and the workflow steps. In one embodiment, the director may be in the form of a rule engine or an expression language processor. The integration manager is provided in communication with the director. The integration manager functions to determine which integration adapter should be invoked when the workflow is executed.

In a further aspect, a computer program product is provided having a computer readable storage medium with embodied computer readable program code. The computer readable program code executes on the computer and supports the dynamic behavior associated with the workflow. Program code is provided to operate a core model at a management level. The core model includes at least one core entity to provide a common view of entities in an enterprise. Program code is provided to extend the functionality of the core model in the form of one or more model extensions, and to establish rules defining the relationship between the core model and each applicable model extension. A defined functionality of the core model remains constant. One or more rules defining a relationship between the core model and the model extension entity are established. Program code is provided to filter the model rules and to establish a relationship between the extension entity and the core model through a rule engine or an expression language processor. Code is also provided to create an integrated system by integration of the model extension entity with the core model. The integration code includes provisions of a customized view of the core model that includes the defined relationship between the core model and any extension entities.

In yet a further aspect, a computer program product is provided having a computer readable storage medium with embodied computer readable program code. The computer readable program code executes on the computer and supports the dynamic behavior associated with the workflow. Program code is provided to operate a core model at a management level. The core model includes a common set of workflows that automate common processes of an enterprise. Program code is provided to support integration of the core model with an external system while the functionality of the workflow remains constant. In addition, program code is provided to establish rules defining a relationship between an integration adapter that supports integration with an external system and a workflow step in the core model. Each rule defines at least one condition under which the integration adapter is to be invoked. Program code is also provided to filter one or more model rules and establish a relationship between the integration adapter and the workflow step, and to select one or more integration adapters to be invoked when the workflow is executed.

In a further aspect, a computer implemented method is provided for product representation, and more specifically for defining aspects of a product in a workflow and enabling extension of the defined aspects and integrating the extensions into the workflow. A core model is provided to operate at a management level. The core model includes one or more core entities that provide a common view of the entities in an enterprise. As articulated above, the functionality of the core model may be extended through one or more model extension entities. Each model extension entity communicates with the core model while a defined functionality of the core model remains constant. One or more rules are established, with the rules defining a relationship between the core model and the model extension entity. Each model rule defines conditions under which the model extension entity applies to the core model. The model rules are filtered, and a relationship between the extension entity and the core model is established through a tool in the form of a rule engine or an expression language processor. An integrated system is formed through integration of the model extension entity with the core model. More specifically, the integrated system provides a customized view of the core model, including the defined relationship between the core model and the model extension entity.

In an even further aspect, a computer implemented method is provided for product representation. A core workflow is provided to operate at a management level. The core workflow includes a common set of workflows that automate common processes in an enterprise. Integration of the workflow with an external system is supported, while the functionality in the workflow remains constant. One or more rules that define a relationship between integration program code and a workflow step are established. Each rule defines at least one condition under which the integration program code is to be invoked. At the same time, the rules are filtered to establish a relationship between the integration program code and the workflow step and to determine which integration program code to invoke when the workflow is executed.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not all embodiments of the invention unless otherwise explicitly indicated. Implications to the contrary are otherwise not to be made.

DETAILED DESCRIPTION

Figure 1:
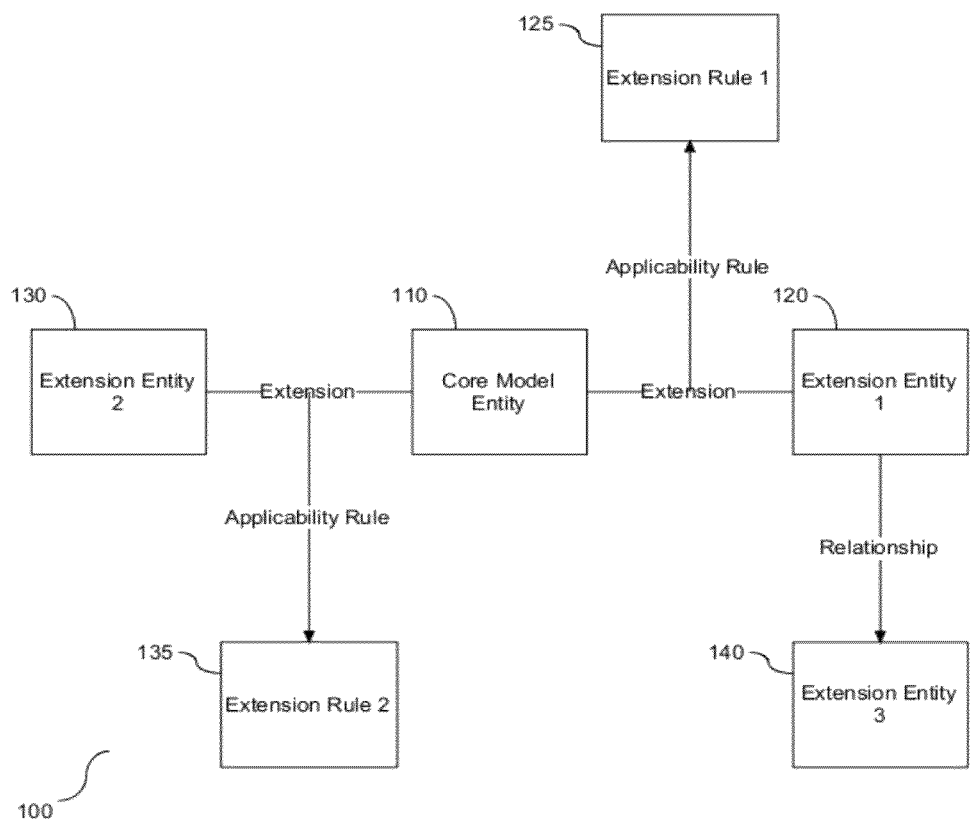
FIG. 1 is an entity diagram illustrating an extension configuration model to represent data.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and directors. A functional unit may be implemented in programmable hardware devices such as field programmable gate arrays, programmable array logic, programmable logic devices, and the like. The functional unit may also be implemented in software for processing by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the manager and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations (e.g., over different storage devices), and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of one or more managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

An enterprise product management system and method are provided. There are several aspects to the product and implementation thereof, with the combination of the aspects providing a comprehensive system that effectuates faster product time to market by providing an integrated solution. As described in FIGS. 1-6 in detail, a platform is provided to represent data and provide a holistic view of the data.

The first aspect of the invention is a centralized enterprise product repository. FIG. 1 is an entity diagram (100) illustrating the first aspect. The product repository is based on a generic core model consisting of entities that represent the many perspectives of a product and the relationship among these entities. These entities include, but are not limited to product structure and composition, product pricing schemes, product presentation in various channels, languages and devices, product fulfillment specifications, product customer configuration parameters, product documentation, product targeting rules, and product points of contact. The generic core model provides a common view of all products in an enterprise. The common view includes how the products are configured, presented, viewed, priced, billed, ordered, fulfilled, categorized, etc. This model supports contextual model extensions: the model can be extended for a particular use by defining one or more entities and relationships. The extensions are associated to the core model entities using XML or database configurations that contain the relationship between the core entity and its extension as well as the business rules under which the extensions apply.

As shown, there is a core model (110) with a first extension entity (120), a second extension entity (130), and a third extension entity (140). The first extension entity (120) is based upon a first extension rule (125), and applicability of the rule. Similarly, the second extension entity (130) is based upon a second extension rule (135), and applicability of the rule. The third extension entity (140) applies based upon the relationship of the third extension entity (140) to the first extension entity (120). The system automatically presents the extensions to the user if the rules are true in the context of the product being defined. In one embodiment, allowable values for each option may be constrained by business rules.

The core model (110) is a general representation of a product management platform. The core model may be employed in separate contexts, including a process model and a data model. The data model consists of entities that represent typical concepts in a trade setting including a customer and its relationship to other customers, customer products, a user profile containing the credentials of a user who has access to the customer product, a billing arrangement that specifies the terms for billing the customer for the purchase or use of a customer product, and the relationship among each of these identified entities.

The process model, also referred to herein as a product management workflow, enables multiple users to collaborate on the definition of a product meta-model, approval of the specified meta-data, certification of the approved meta-data, publishing of the certified meta-data to one or more databases where it is accessible by various trade channels, customer acquisition applications, customer care applications, revenue management application, and order fulfillment application. In one embodiment, the core may be employed to represent all aspects of a product, and to recursively assemble parts into a product. Details of the functionality of the data model are described below with respect to the comprehensive core product meta-model.

Both the process model and the data model employ a core model with extensions, as shown and described in FIG. 1. Each extension is driven by one or more rules. Behavior is adjusted on the defined rules, and specifically on the defined extensions. For example, introduction of a new product into the product management platform requires a definition of a new extension entity together with rules to associate the new extension entity with the core model. A view of the platform incorporates the core model with each applicable and defined extension entity, e.g. each extension entity is inclusive. The application of one or more extension entities changes the view of the platform but does not change the core model. Accordingly, a different view is provided based on the applicable extension entities.

Figure 2:
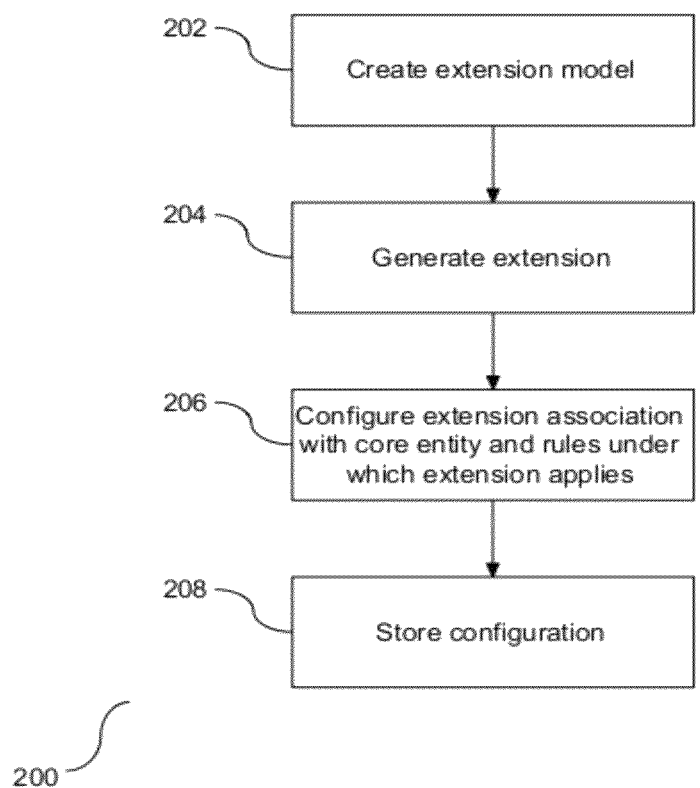
FIG. 2 is a flow chart illustrating an extension configuration process.

The models support contextual product configuration parameters that allow the user to specify different configuration options and the rules under which each option applies. FIG. 2 is a flow chart (200) illustrating the process for configuration of an extension entity and an associated rule. As shown, a model extension is defined (202) and one or more entities are created (204). For each created entity, a core extension is configured (206). The configuration includes identification of the core entity and the rules under which the extension applies to the core entity. Once the association is completed, the configuration at step (206) is stored (208). Extension entities and associated rules defining the relationship of the extension entity to the core entity are configured. Accordingly, a rule is used to tie the extension with the core and the tie is stored as a configuration.

Figure 3:
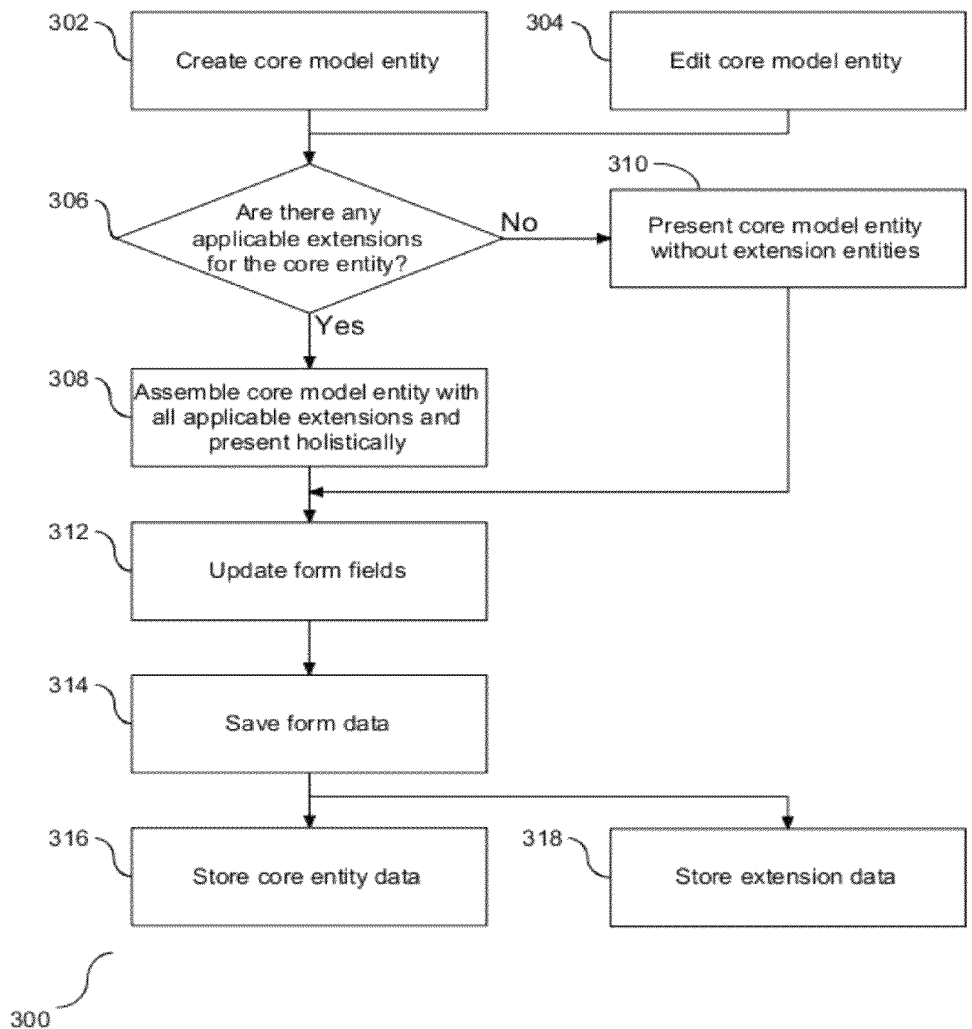
FIG. 3 is a flow chart illustrating presentation of one or more model extensions.

FIG. 3 is a flow chart (300) illustrating a run time use of one or more extension entities. As shown, a core model entity is created with a new product (302) or edited with an existing product (304). Following either of steps (302) or (304), it is determined if there are any applicable extensions (306) to the entities created or edited at steps (302) and (304), respectively. Based upon the applicable extension(s) as reflected in a positive response to the determination at step (306), the core model is assembled with all extensions that have been determined to apply and is presented holistically (308). Conversely, a negative response to the determination at step (306) is followed by a presentation of the core model without any extensions (310). Following step (308), form fields of the combined core and extension models or the form fields of the core without any extensions are updated (312) with any new data applicable to the particulars of the underlying product and the form data saved (314). The aspect of storing the form data includes storing the core entity data (316) and storing the extension data (318). In one embodiment, the core data is stored in a core database table and the extension data is stored in an extension database tables. Any product characteristic can be extended in the extension entity, including but not limited to, pricing, billing, presentation, etc. Accordingly, shared product characteristics of the product that are common to a plurality of product are defined in the core and unique characteristics of the product are defined in the extension entity, with the view of the product transparently combining the core and the extension into a single cohesive entity.

Figure 4:
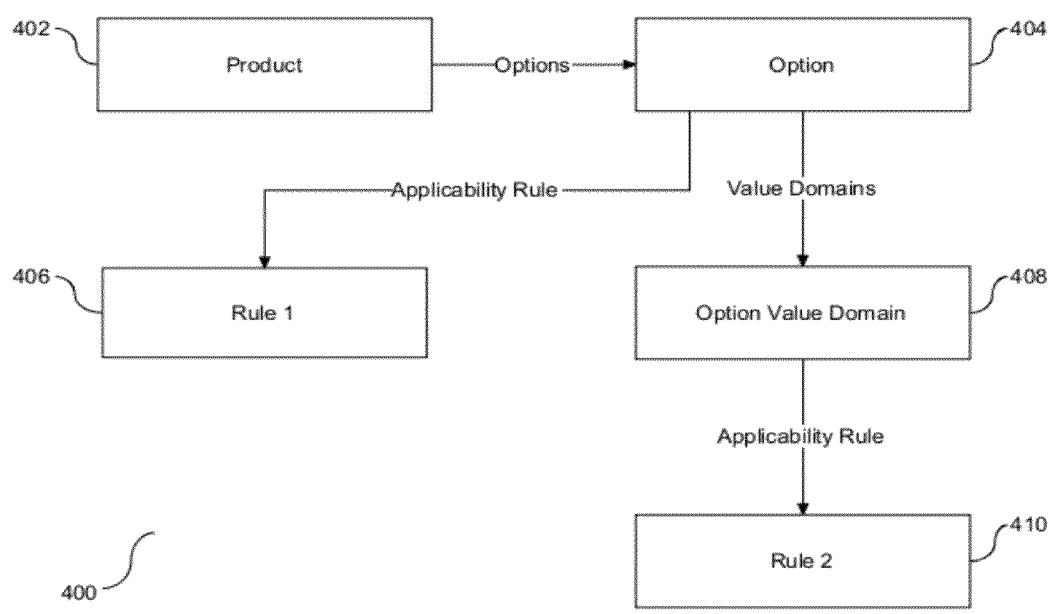
FIG. 4 is an entity diagram illustrating an alternate aspect of presentation of one or more model extensions.

FIG. 4 is a flow chart (400) illustrating configuring a product option for the core model. In one embodiment, the configuration supports customization of a product. Options and values are driven by rules. An option rule defines the conditions under which the option is applicable. If the rule evaluates to true at run time, the user is presented with the corresponding option to configure, if the rule evaluates to false at run time, the corresponding option is not presented to the user. An option value domain defines the set of allowable values that the user can specify when presented with an option to configure. The domain may be enumerated or it may be specified by a data type and additional constraints on the values. For example, in one embodiment, an option value domain may specify that the allowable values for the configuration of an option are of a numeric data type with the additional constraints that the values have to be greater than 1000. An option value domain rule specifies the conditions under which the corresponding domain is applicable. Therefore, the same option may have more than one option value domain and the rules are used to filter which option value domain is used at run time. If the rule evaluates to true at run time, the user is presented with the appropriate user interface component to input data that is valid for the corresponding option value domain. As shown, a product is provided (402) and all applicable rules and value domains for a product option are ascertained (404). Application of the option rule without an associated value domain indicates that there are no restrictions on the product option, and the option rule is applied (406). Conversely, a restriction on the product option is followed by application of the product domains (408) followed by application of all associated rules that support the selected option(s) (410). Accordingly, different values may be configured for an associated option or option value domain.

Figure 5:
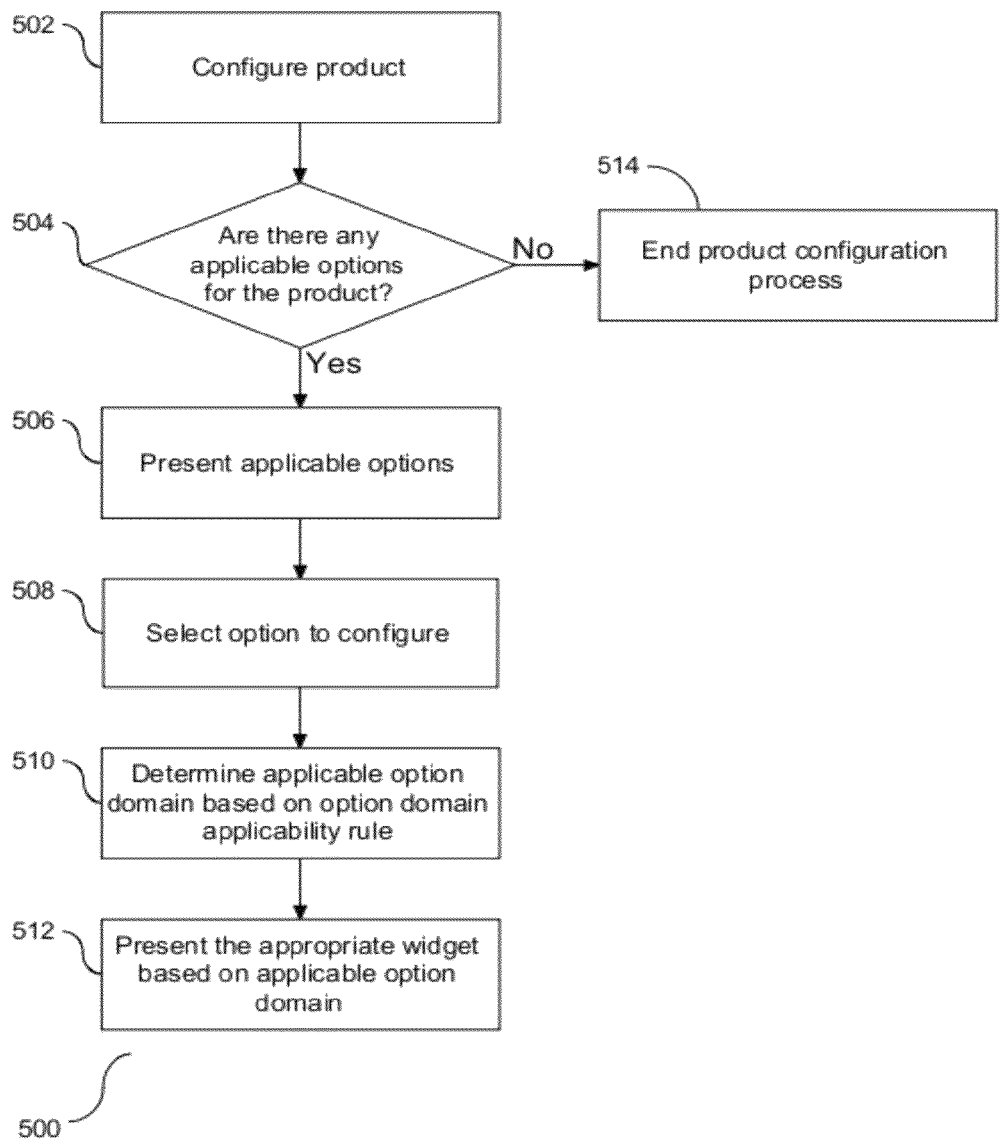
FIG. 5 is a flow chart illustrating option presentation.

FIG. 5 is a flow chart (500) illustrating a process for presentation of options for product configuration at run-time. As shown, a product is selected (502). Applicable options are determined based on one or more optional applicability rules (504). A negative response to the determination at step (504) concludes the product configuration process (514). However, if there are any options available for configuration, all available options for the product are presented (506), and one option is selected for configuration (508). Thereafter, an applicable option domain is determined based upon an applicable option domain rule (510). Based upon the selected option and associated option domain, the appropriate user interface component is presented (512). Steps (508)-(512) may be repeated for each applicable product option. Accordingly, the extension model may be configured at run-time for specific products and associated domains.

The product management platform shown and described in FIGS. 1-5 illustrates a data model schema, including model extensions, to provide a holistic picture of data representation. The data model schema is acted upon by one or more processes. FIGS. 6-15 described below employs the product management platform with a process model to organize and define a common set of workflows and automate common processes in an enterprise.

Figure 6:
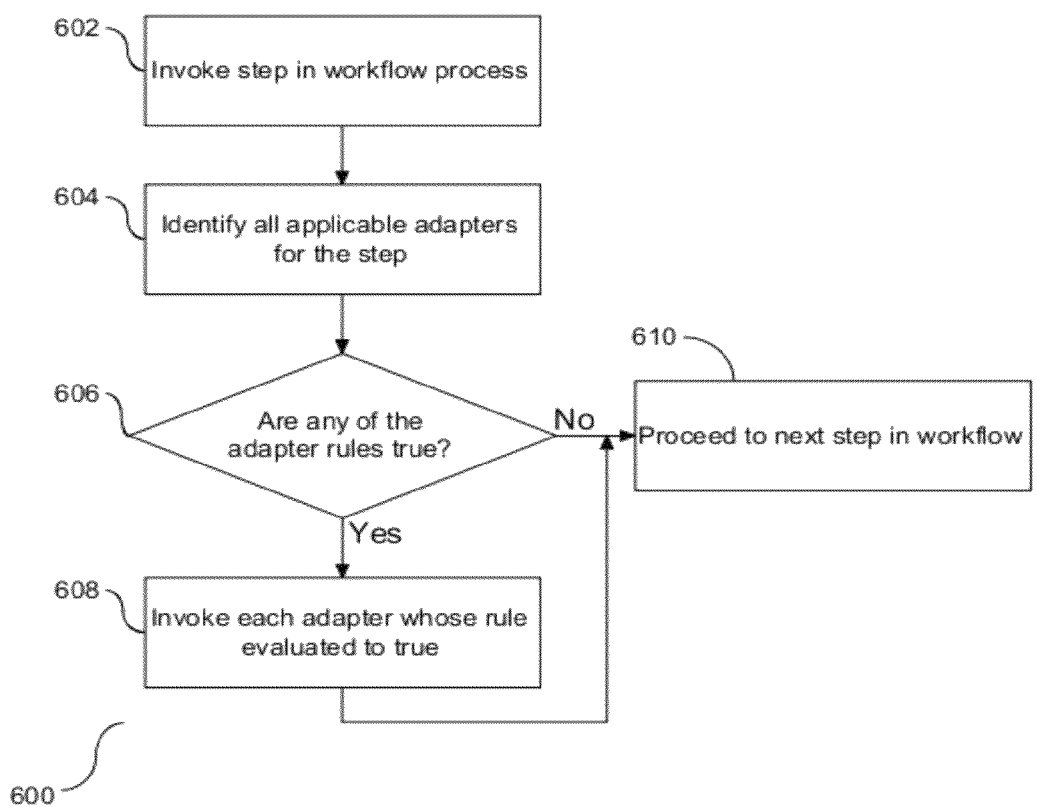
FIG. 6 is a flow chart illustrating a product management platform demonstrating behavior for a workflow.

FIG. 6 is a flow chart (600) illustrating a product management platform demonstrating behavior for a workflow. A general workflow is comprised of a series of steps. Each step in the workflow may invoke one or more adapters to extend the process. For example, an adapter may join the workflow to bring in a new business partner. A step in the workflow process is invoked (602), and all applicable adapters to the invoked step are identified (604). Based on matching rules, it is determined if any of the adapters have rules that are true at run time (606). A positive response to the determination at step (606) is followed by invoking each of the adapters with rules that are true (608). A negative response to the determination at step (606) does not invoke any of the identified adapters, and is followed by proceeding to the next step in the workflow (610). The process outlined in steps (604)-(610) are repeated for each step in the workflow. The steps in the workflow may be sequential or parallel, and in one embodiment, there may be human involvement between steps. Accordingly, the process shown herein illustrates a general concept of a workflow with adapters and rules, and the manner in which applicable adapters join the workflow without changing the workflow steps. The workflow itself is not aware of the integration adapters at the design time of the workflow. The integration adapters are registered with the workflow after the fact and the rules determine the conditions under which each integration adapter should be invoked at run time, e.g. dynamic integration.

Figure 7:
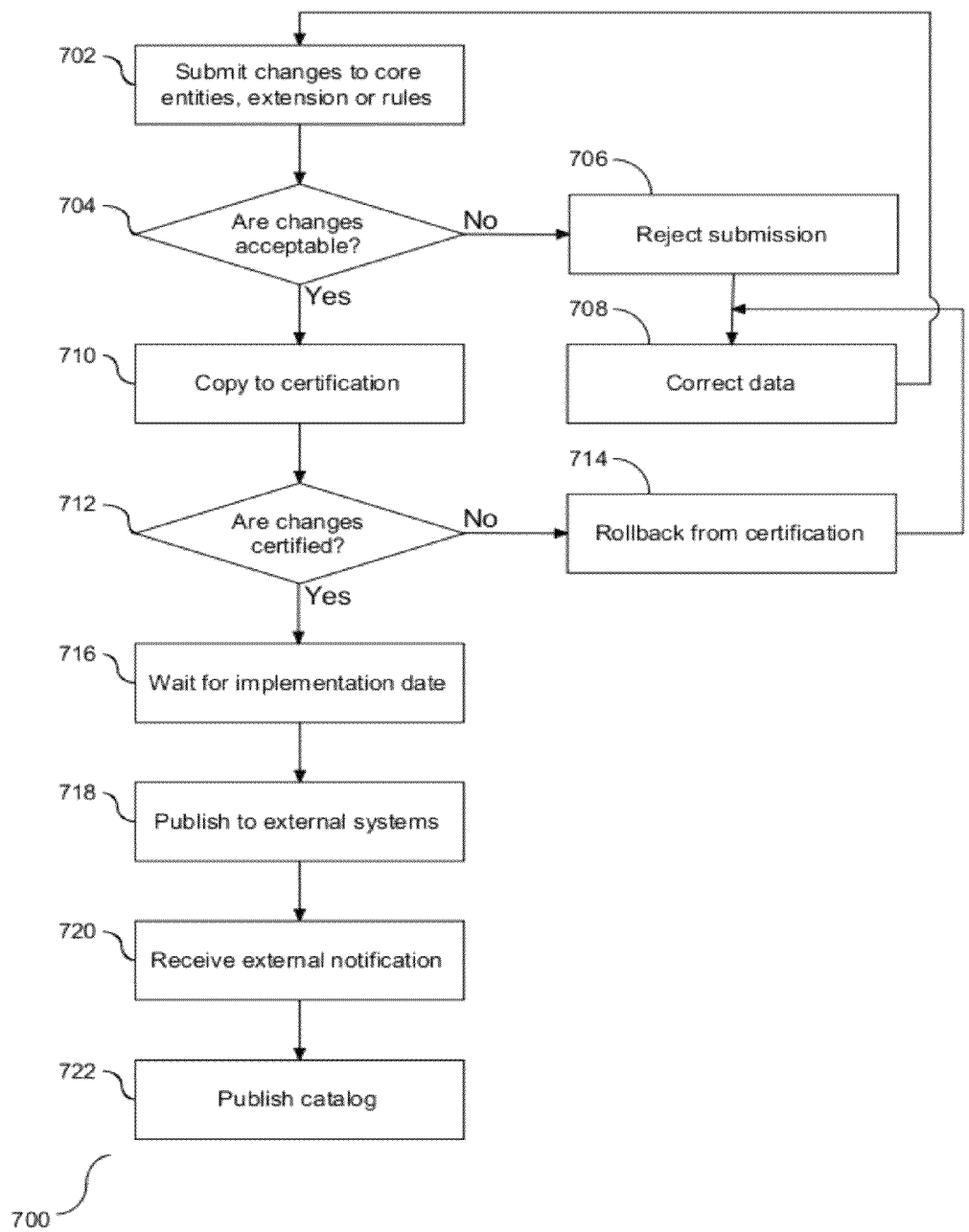
FIG. 7 is a flow chart illustrating invocation of a contextual integration adapter.

All changes to a product introduced through the central repository, can be propagated to any enterprise application that requires knowledge of these changes. Specifically, changes to the product configuration, such as rules, extension, etc., effects the customer view of the product. FIG. 7 is a flow chart (700) illustrating the behavioral aspect of invoking adapters in a workflow. In one embodiment, product configuration changes are referred to as a meta data publishing process using contextual integration adapters to propagate the changes to the relevant applications. More specifically, changes to a product may not be relevant to each application in the enterprise. A central system ensures that only those applications in the enterprise that require the change information have such knowledge communicated and populated in such applications.

As shown in FIG. 7, changes pertaining to change in any one of the core entities, rules and/or adapters are submitted (702). In one embodiment, the changes to an applicable element, including the core entity, one or more extension, rules, etc. at step (702) are submitted. Prior to publication, the changes are reviewed to determine if the changes are acceptable (704). A negative response to the determination at step (704) rejects the submission (706), followed by a correction of the change data (708) and resubmission of the changes at step (702). Conversely, a positive response to the determination at step (704) copies the approved change submission to certification (710), followed by a second determination at step (712) to assess whether the submission accepted for publication is approved for certification. The aspect of copying to certification at step (710) includes testing new product metadata to be processed and instructing the adapter to generate its output data and store it in the certification database for inspection prior to transmitting it to a target system. Accordingly, for each adapter all changes are submitted for publication and certification.

A rejection at step (712) rolls back the submission from certification (714) and returns to step (708) for correction and resubmission. Each submission that is certified for publication has an associated release date. A positive response to the determination at step (714) is followed by waiting for the implementation date (716) after which the certified submission is published to one or more external systems (718). More specifically, the publication of the certified submission invokes one or more adapters to communicate with one or more external systems. Following step (718) the workflow waits for an external notification confirming successful transmission of data to a target system to be received from each external system adapter (720) and once all external system adapters have successfully sent their notifications, the submission is published to an associated product catalog (722) where it is accessible by a variety of trade channels. Accordingly, for each adapter invoked into the workflow, a publication and certification process is invoked to ensure that the workflow has properly integrated the adapter and the associated changes.

As shown in FIG. 7, invocation of contextual integration adapters to perform data transformation and communication to an external system is provided. More specifically, the contextual integration adapters dynamically register with a generic meta data publishing process through XML or database configurations that contain business rules under which an associated adapter is to be invoked. In one embodiment, an integration adapter may be developed after the original workflow, with the original workflow having no knowledge of the existence of the integration adapter at the time of design. The generic process invokes all adapters whose business rules evaluate to true in a given product context. Each adapter transforms the data to the appropriate format of the target application and communicates with the target application using its native Application Programming Interface.

Figure 8:
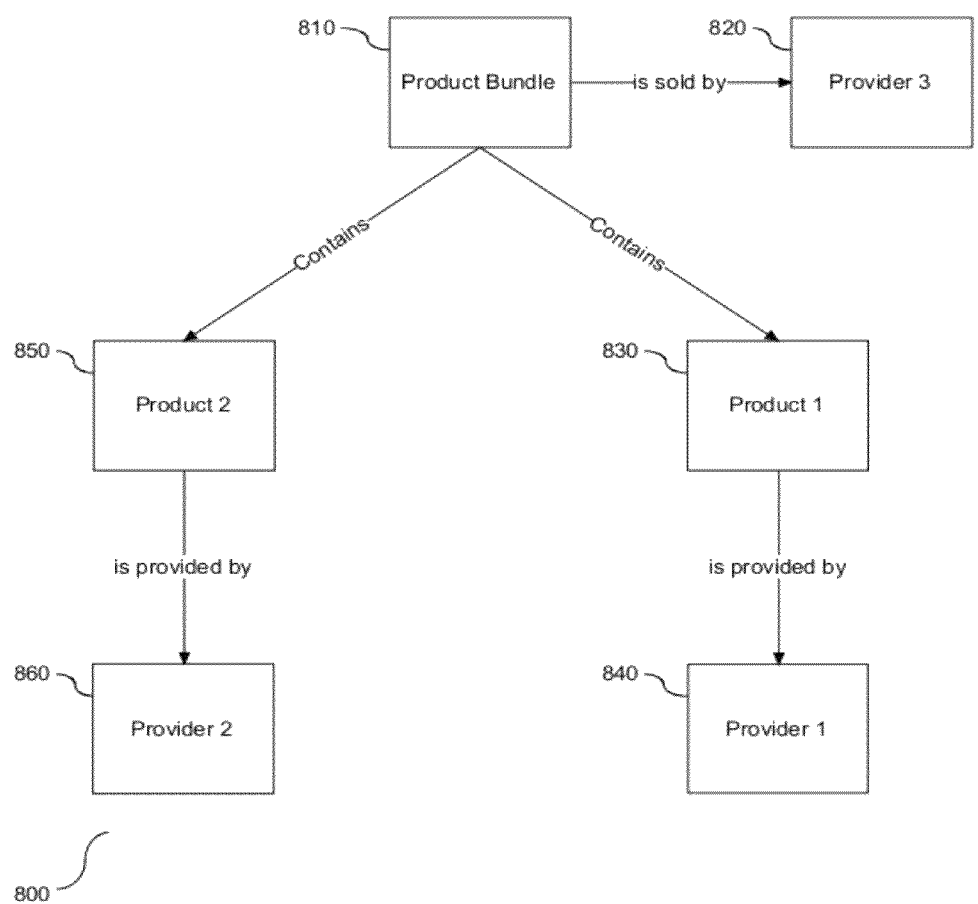
FIG. 8 is an entity diagram illustrating bundling of a multi-provider product.

One challenge associated with product and product marketing is that a grouping of products that are appealing to a customer may not be all provided by a single provider. For physical goods, selling these bundles requires the maintenance of a product inventory. A large inventory is expensive to maintain, and at the same time, a small inventory may result in an inability to deliver the product when demanded. For electronic or digital products selling these bundles requires complex fulfillment integration and revenue sharing models. To alleviate these issues, the platform supports multi-provider product bundling. FIG. 8 is a flow chart (800) illustrating multiple provider product bundling. As shown, a product bundle (810) is sold by a provider (820). The product bundle includes two products provided by two separate providers. More specifically, the product bundle (810) includes a first product (830) provided by a first provider (840) and a second product (850) provided by a second provider (860). This allows a product offering to contain products from multiple providers that are sold to a customer as a bundle. Revenue allocations to each provider can be specified as part of the product configuration. When such a bundle is ordered by a customer, the fulfillment step in the order processing workflow determines the integration adapters that need to be invoked for each participating product or product component in the bundle.

Figure 9:
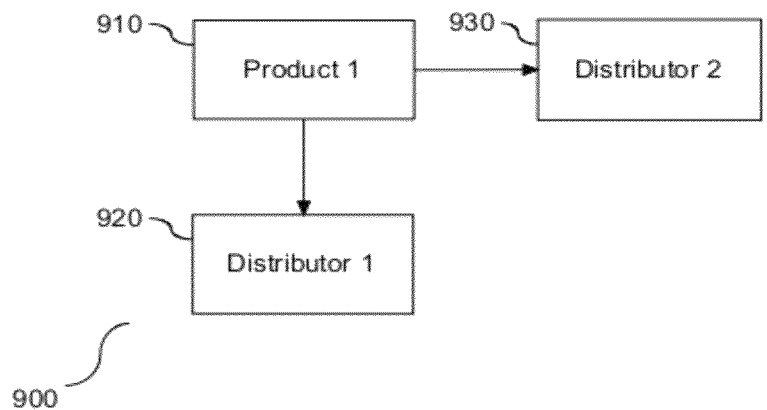
FIG. 9 is an entity diagram illustrating a multi-distributor configuration.

The platform supports multi-distributor product fulfillment. This allows a given product to be fulfilled by one of a number of distributors depending on a set of business rules that govern the applicability of a particular distributor. FIG. 9 is a flow chart (900) illustrating a multi-distributor configuration. As shown, a product is provided (910) and it is associated with two distributors (920) and (930). A purchase or purchase order for the product may be fulfilled by either of the distributors (920) and (930). In one embodiment, selection of a distributor may be associated with specific rules, such as geographical location of the customer placing the product order. Accordingly, multiple distributors for the same product may be defined in the platform.

Figure 10:
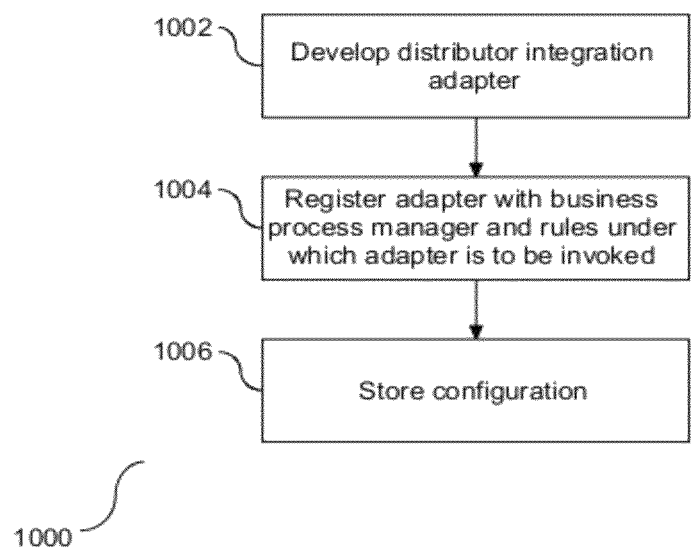
FIG. 10 is a flow chart illustrating registration of a distributor adapter.

Each of the multiple distributors is integrated using a fulfillment adapter that is invoked during order processing. FIG. 10 is a flow chart (1000) illustrating a distributor adapter registration. Each fulfillment adapter (1002) registers with the generic order processing workflow under which the adapted is to be invoked (1004), and the configuration is stored (1006). In one embodiment the registration takes place using XML configurations as well as a set of business rules under which the fulfillment adapter is applicable. The rules may be based on geographical context, e.g. different distributors in different countries, product context, e.g. $Product_1$ is fulfilled by $Distributor_1$ while $Product_2$ is fulfilled by $Distributor_2$), customer profile context (very important customer versus regular customer), or a combination of these.

Figure 11:
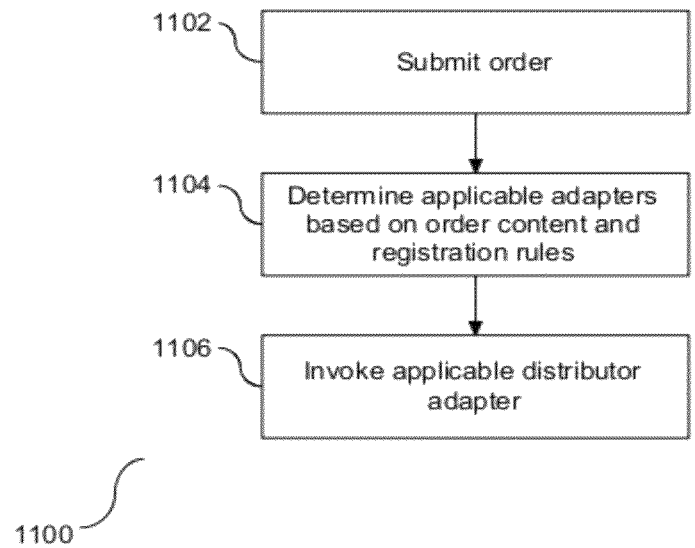
FIG. 11 is a flow chart illustrating multi-distributor order processing.

FIG. 11 is a flow chart (1100) illustrating order processing for multiple distributors. As shown, an order is submitted (1102), and applicable distributor adapters are determined (1104). In one embodiment, the applicable distributor adapters are determined based on order content and registration rules. Following step (1104), the applicable distributor adapters to process the order are invoked (1106).

Figure 12:
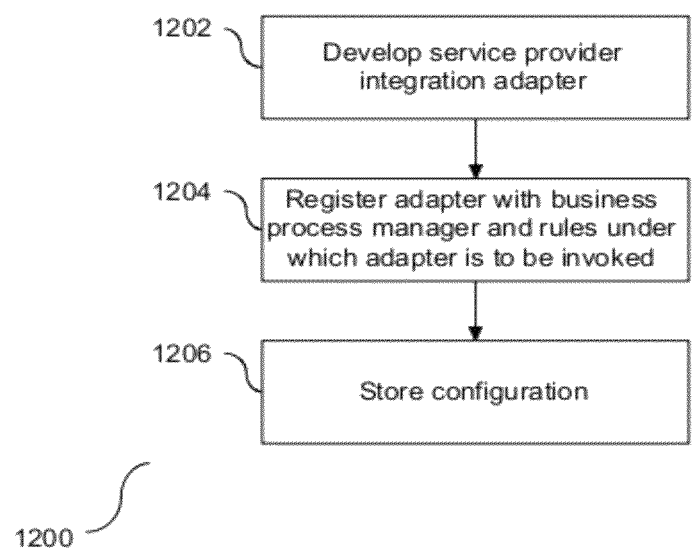
FIG. 12 is a flow chart illustrating service provider registration.

As shown in FIG. 12, the process workflow supports binding a context based service provider. This allows one or more service providers to support an automated business process workflow. FIG. 12 is a flow chart (1200) illustrating the service provider registration process. Each provider has an integration adapter (1202) that dynamically registers with the business process workflow. The registration specifies the rules under which the adapter is to be invoked and the workflow step in which the adapter is to be invoked. In one embodiment, the dynamic registration process employs XML configurations containing the association of the integration adapter with a workflow step and the business rules under which the adapter is to be invoked (1204). Following the registration process, the configuration is stored (1206). Accordingly, one or more service providers may be integrated with the business process workflow.

Figure 13:
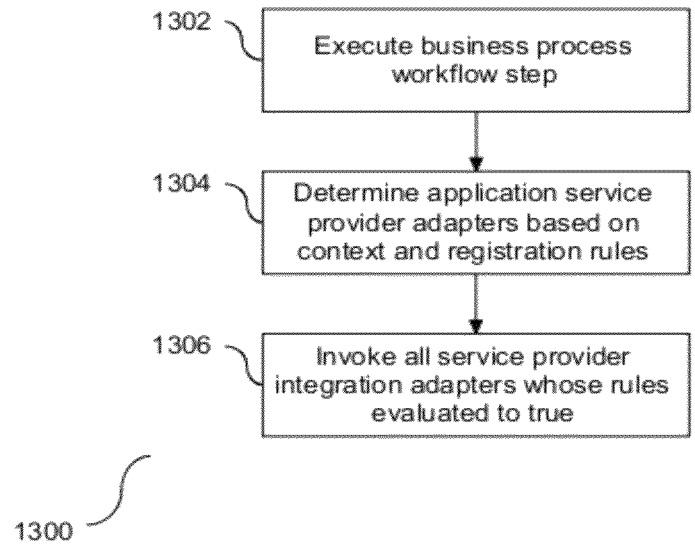
FIG. 13 is a flow chart illustrating service provider invocation.

Once the service provider has a registered adapter, the adapter may be invoked. FIG. 13 is a flow chart (1300) illustrating a process for invoking a service provider (1302). The generic process determines applicable service provider adapters based on context and registration rules (1304), and invokes all adapters whose business rules evaluate to true in a given context (1306). Each adapter transforms the data to the appropriate format of the target service provider and communicates to the service provider using its native interfaces. In one embodiment, the adapters may be invoked in a particular order, such multiple adapters being invoked in parallel or in series. However, the invention should not be limited to invoking the adapters in any particular order. In one embodiment, an integration adapter may be developed after the original workflow, with the original workflow having no knowledge of the existence of the integration adapter at the time of design. The generic process invokes all adapters whose business rules evaluate to true in a given context.

Figure 14:
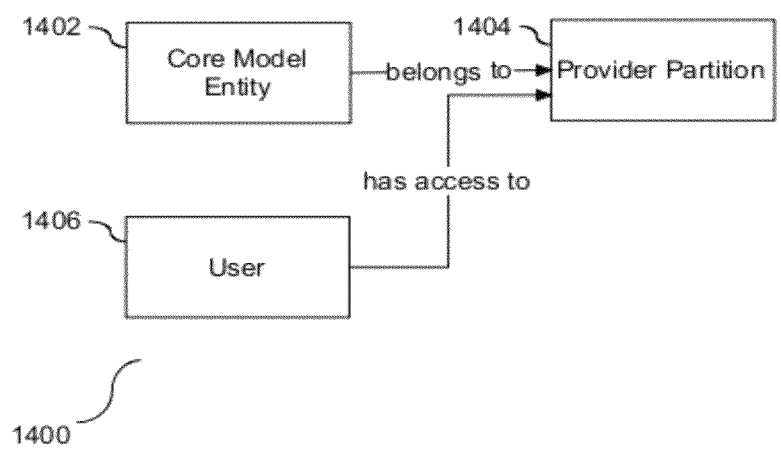
FIG. 14 is an entity diagram illustrating multi-provider repository partitioning.

Multi-providers may co-exist in the same workflow through partitioning, i.e. multi-provider repository partitioning. FIG. 14 is a flow chart (1400) illustrating multi-provider repository partitioning. This allows multiple product providers to co-exist in the same product repository. More specifically, each product is associated to a common partition that is shared across multiple providers or to a specific partition that is only visible to a particular provider. As shown, a core model entity (1402) is provided and belongs to a provider partition (1404). User access to a product is constrained by the partitions to which they are authorized (1406).

The platform supports location based offer targeting. This allows a particular product to be offered to a customer based on their current physical longitude and latitude coordinates. For example, offering coupons for a particular merchant as soon as one enters the premises of that merchant. Another example is presenting an offer based on proximity to a particular establishment such as a restaurant.

Figure 15:
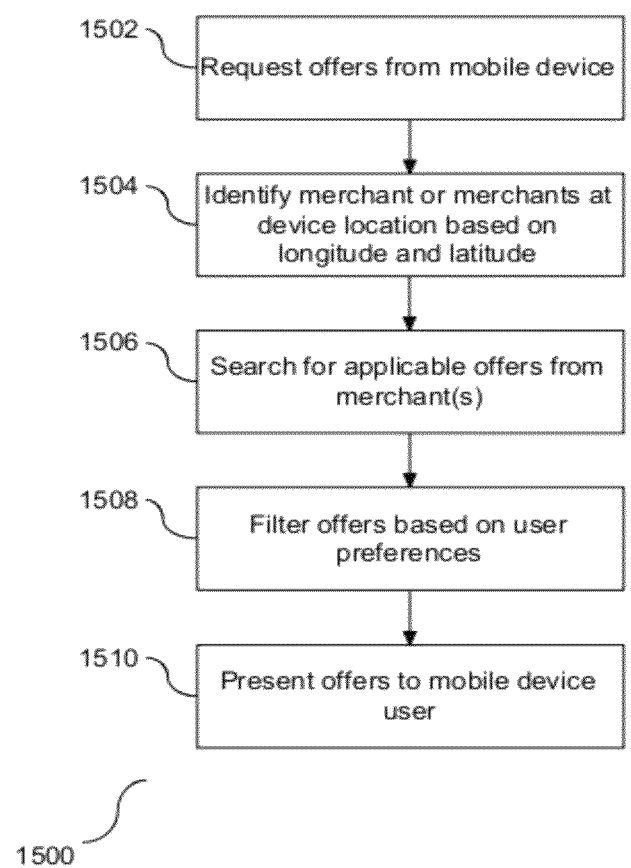
FIG. 15 is a flow chart illustrating a process for location based offer targeting.

FIG. 15 is a flow chart (1500) illustrating a process for location based offer targeting. As shown, request offers are received (1502). In one embodiment, the offers received at step (1502) take place through a mobile device. As such, one or more merchants at the device location are identified (1504). In one embodiment, the location is identified based upon global based positioning data, longitude and latitude, etc. Once the location has been identified, the process searches for applicable offers from merchants (1506). These applicable offers are then filtered based upon user preferences (1508), following by presentation of the offer(s) to the user of the mobile device (1510). Accordingly, the offer submission dynamically accommodates changes to geographic location.

Figure 16:
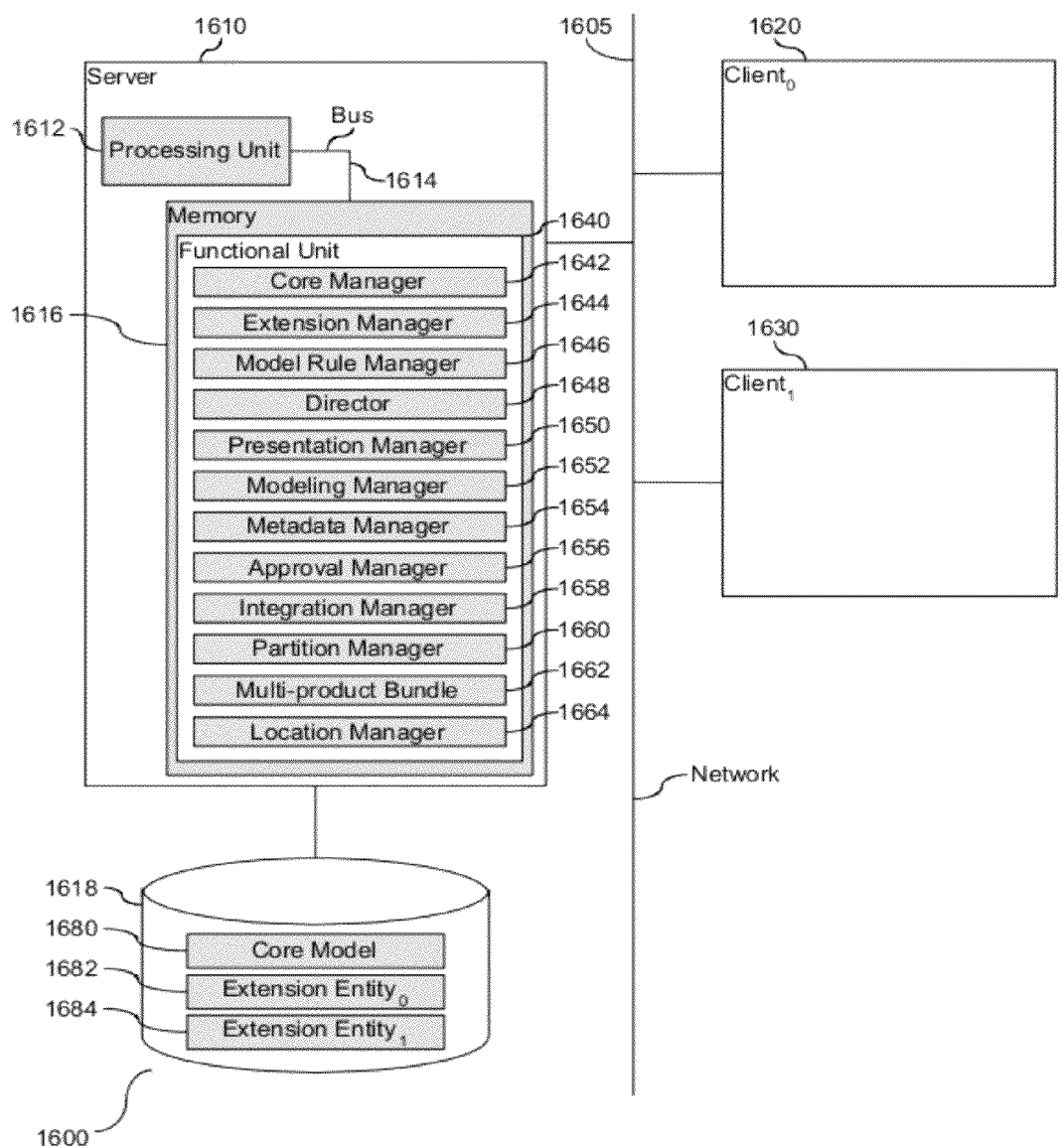
FIG. 16 is a block diagram illustrating tools embedded in a system to support the centralized enterprise product repository.
Figure 17:
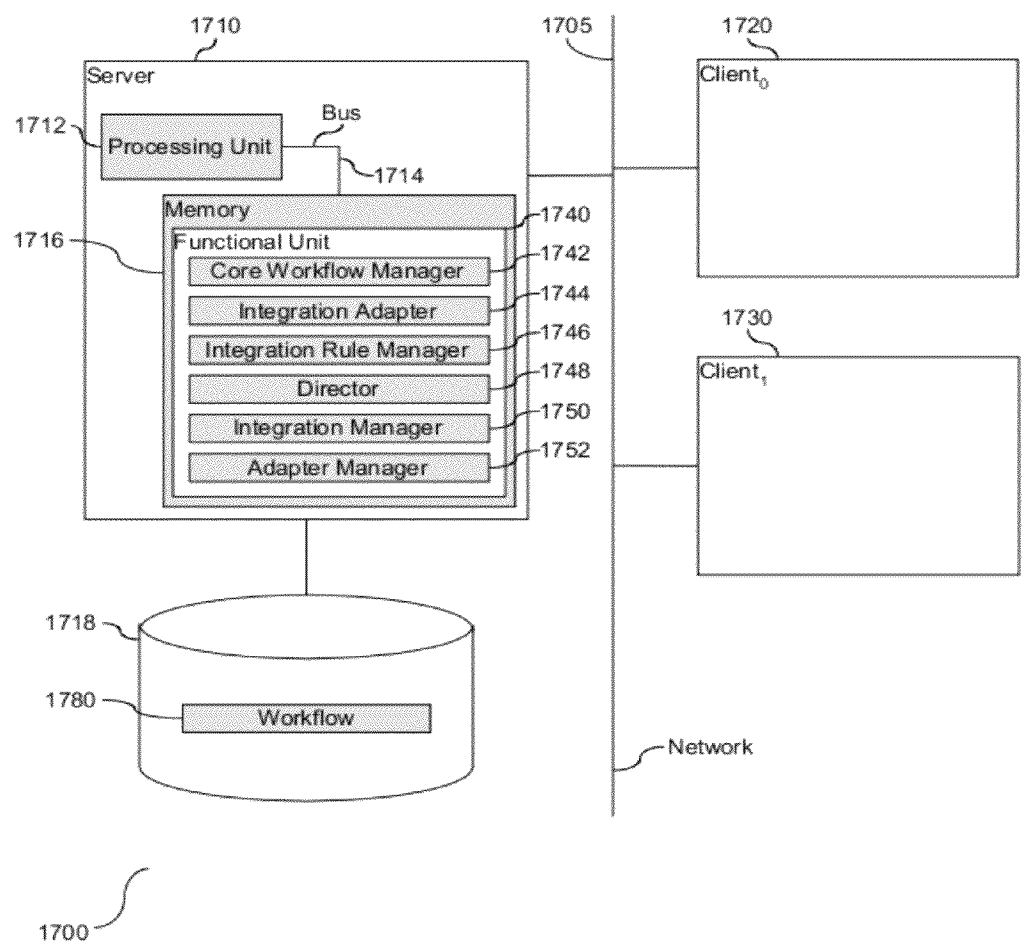
FIG. 17 is a block diagram illustrating tools embedded in a system to drive dynamic behavior for workflow.

As described above, there are two aspects to the invention, including a centralized enterprise product repository based on a generic core model consisting of entities that represent the many perspectives of a product and the relationship among these entities. The second aspect pertains to a product management platform demonstrating behavior for a workflow. Each of these aspects is described above in the flow charts and diagrams illustrating the processes. FIGS. 16 and 17, as described below, illustrate the hardware tools and articles of manufacture to support the centralized enterprise product repository and the product management platform demonstrating behavior for a workflow, respectively.

FIG. 16 is a block diagram (1600) illustrating tools embedded in a system to support the centralized enterprise product repository. For illustrative purposes, a server (1610) is provided in communication with one or more computing machines (1620) and (1630) across a network connection (1605). Although only two computing machines (1620) and (1630) are shown herein, the quantity should not be a limiting factor. The server (1610) is provided with a processing unit (1612) in communication with memory (1616) across a bus (1614), and data storage (1618). A functional unit (1640) is provided in communication with the memory (1616) to support the centralized enterprise product repository.

The functional unit (1640) is shown herein with several tools to support a product management platform that employs metadata and rules to drive dynamic behavior for workflow, user experience, and system integration. Specifically, the tools include, but are not limited to a core manager (1642), a model extension entity manager (1644), a model rule manager (1646), a director (1648), a presentation manager (1650), a modeling manager (1652), a metadata manager (1654), an approval manager (1656), an integration manager (1658), a partition manager (1660), a multi-product bundle (1662), and a location manager (1664). The core manager (1642) is provided in communication with the processing unit (1612). The core manager (1642) operates at a management level and includes one or more entities to provide a common view of the entities in an associated enterprise. Specifically, the core manager (1642) describes a customer model that contains common concepts in a trade setting. In one embodiment, the core manager (1642) represents products in an enterprise. These common concepts include, but are not limited to, types of customers, relationships to customers, customer products, billing arrangements, order, or user profiles. In one embodiment, one or more options and associated option values are defined within the core manager (1642), together with a defined applicability of the option and any allowable value driven by the option rule which drive dynamic behavior of experience on an interface. The extension manager (1644) is provided to extend the functionality of the core model. The extension manager (1644) communicates with the core manager (1642), and more specifically supports the functionality of the core model. At the same time, the defined functionality of the core model remains constant.

As shown herein, data storage (1618) includes the core model (1680) and two extension entities (1682) and (1684). The model rule manager (1646) functions to define the relationship between the core model (1680) and the extension entities (1682) and (1684). More specifically, the model rule manager (1646) defines one or more conditions under which the model extension entity (1682), (1684) relates to the core model (1680). In addition, the director (1648) is provided in communication with the model rule manager (1646). The director (1648) functions to filter the model rules and based upon this filtering establishes a relationship between one or more of the extension entities (1682), (1684) and the core model (1680). In one embodiment, the relationship is stored in a relational database, an XML file, or a NoSQL database. The director (1684) may come in the form of a rule engine or an expression language processor. An integrated system is formed by the presentation manager (1650). More specifically, the presentation manager (1650) communicates with the core manager (1642) and the extension manager (1644) to integrate the applicable extension entities (1682), (1684) with the core model (1680). In one embodiment, a customized view of the core model (1680) is supported by the presentation manager (1650), with the customized view including the relationship between the core model (1680) and the applicable model extension entities (1682), (1684). The presentation manager (1650) functions to dynamically change an interface associated with a workflow step, with the change based upon applicability of one or more extensions. In one embodiment, a rule engine determines this applicability. Accordingly, the presentation manager (1650) provides a holistic view of the workflow through integration of the core model (1680) with each applicable extension entity (1682), (1684) via the core manager (1642) and the extension manager (1644).

The modeling manager (1652) is provided in communication with the extension manager (1644) and functions to model the extension. More specifically, the modeling manager (1652) generates a corresponding extension based on the model and associates the corresponding extension with the core manager (1642). This association includes identification of at least one rule under which the corresponding extension (1682), (1684) applies to the core model (1680). The rule is in the form of a new rule or an existing rule. In one embodiment, the rule is expressed in an expression language statement or a rules engine language.

The metadata manager (1654) is provided in the system to amend metadata associated with one or more of the model entities. The approval manager (1656) is provided in communication with the metadata manager (1654) and functions to review and certify metadata amended by the metadata manager (1654). In one embodiment, the review and certification takes place prior to publication of the amended metadata to target systems. The integration manager (1658) is provided in communication with the metadata manager (1654). The integration manager (1658) functions to amend and propagate new information into the integrated system.

The core manager (1642) together with the extension manager (1644) provides a holistic view of an enterprise with a plurality of products. The partition manager (1660) is in communication with the presentation manager (1650). Specifically, the partition manager (1660) creates a partition in the enterprise to delineate access privileges to select information in the repository. In one embodiment, a multi-product bundle is provided in the enterprise, with the bundle being in the form of a combination of products from separate providers and each provider assigned to deliver a component of the bundle. As shown, the core model (1680) is provided local to a data repository (1618) in communication with memory (1616). The data repository (1618) may be a shared repository of two or more products. The core model (1680) includes a rule to filter a subset of characteristics from the core model (1680)

and to apply the subset to a target audience. The rule may be based on geography, privacy, channels of trade, customer profile, and/or attributes in model extensions. Accordingly, various tools may be employed to provide security and accessibility within the enterprise.

The core model (1680) is the basis of the enterprise workflow. The core model (1680) represents and defines the multi-dimensional aspect of a product. More specifically, the core model represents the following aspects of the product: product structure, product composition, product pricing schemes, product representation in various channels, languages, and devices, product fulfillment specification, product customer configuration parameters, product documentation, product targeting rules, and product points of contact. The core model represents each of these aspects in a multi-dimensional manner so that the relationships among all aspects of the product are defined.

The core model (1680) employs a catalog of product metadata, which drives dynamic behavior of the workflow together with integration of at least one external system through the combination of the core and extension entities (1682), (1684), respectively. The dynamic behavior may be apparent in different venues. For example, the location manager (1664) assesses the current geographical location so that the presentation manager (1650) may present an offer to the interface based on the geographic location. This offer is dynamically driven by the current geographic location so that specific offer targeting rules and user preferences are employed. At the same time, the presentation manager (1650) may dynamically change the interface based upon a filter selection of preferences. It should be noted that the interface is the presentation of the workflow to an associated user. The interface may be browser based, mobile device based, or based on a web service. Accordingly, the workflow presentation and associated interface are dynamically modified based upon select preferences and geographic location.

As identified above, the core manager (1642), extension manager (1644), model rule manager (1646), director (1648), presentation manager (1650), modeling manager (1652), metadata manager (1654), approval manager (1656), integration manager (1658), partition manager (1660), multi-product bundle (1662), and location manager (1664), hereinafter referred to as tools, function as elements to dynamically support a product management platform and associated platform behavior. The tools (1642)-(1664) are shown residing in memory (1616) local to the server (1610). However, the tools (1642)-(1664) may reside as hardware tools external to the memory (1616), or they may be implemented as a combination of hardware and software. Similarly, in one embodiment, the tools (1642)-(1664) may be combined into a single functional item that incorporates the functionality of the separate items. As shown herein, each of the tools (1642)-(1664) are shown local to the server (1610). However, in one embodiment they may be collectively or individually distributed across a network or multiple machines and function as a unit to dynamically support a product management platform and associated platform behavior. Accordingly, the tools may be implemented as software tools, hardware tools, or a combination of software and hardware tools.

The product management platform employs metadata and rule to drive the dynamic behavior for workflow, user experience, and system integration. FIG. 17 is a block diagram (1700) illustrating tools embedded in a system to support the centralized enterprise workflow. For illustrative purposes, a server (1710) is provided in communication with one or more computing machines (1720) and (1730) across a network connection (1705). Although only two computing machines (1720) and (1730) are shown herein, the quantity should not be a limiting factor. The server (1710) is provided with a processing unit (1712) in communication with memory (1716) across a bus (1714), and in communication with data storage (1718). A functional unit (1740) is provided in communication with the memory (1716) to support the centralized enterprise product repository.

The functional unit (1740) is shown herein with several tools to support the dynamic aspect of the workflow, user experience, and system integration. Specifically, the tools include, but are not limited to a core workflow manager (1742), an integration adapter (1744), an integration rule manager (1746), a director (1748), an integration manager (1750), and an adapter manager (1752). The core workflow manager (1742) is provided in communication with the processing unit (1712). The core workflow manager (1742) operates at a management level and includes a common set of workflows that automate common processes in an enterprise. More specifically, for each defined enterprise there is a common set of processes that are supported by a common workflow (1780). The integration adapter (1744) is configured to communicate with the core workflow manager (1742), and to support integration of the workflow (1780) with an external system. At the same time, the integration adapter (1744) maintains the functionality for integrating an external system into the workflow (1780). Accordingly, the basis of the workflow may be expanded without affecting the integrity of the system as a whole.

The integration rule manager (1746) is provided in communication with the integration adapter (1744). More specifically, the integration rule manager (1746) establishes rules that define a relationship between the integration adapter (1744) and a workflow step. Each established rule defines at least one condition under which the integration adapter (1744) is to be invoked in the workflow (1780). The director (1748) is provided in communication with the integration rule manager (1746). Specifically, the director (1748) filters the rules and establishes a relationship between the integration adapter (1744) and the workflow step. The director (1748) may be in the form of a rule engine or an expression language processor. The integration manager (1750) is provided in communication with the director (1748) and functions to determine which integration adapter (1744) should be invoked when the workflow is executed. Accordingly, the tools (1742)-(1750) support integration of adapters into the workflow through a set of rules.

The adapter manager (1752) functions in communication with the integration manager (1750) to apply an adapter applicability rule that defines integration of an adapter with the workflow. In one embodiment, the adapter is dynamically determined at run time. Similarly, in one embodiment, two or more integration adapters (1744) are provided in communication with a separate product distributor. Each of the multiple integration adapters (1744) has one or more rules that define distribution of a product to an end consumer. The integration manager (1750) functions to select one of the multiple integration adapters (1744) based upon application of the rules. The workflow may come in various forms, including but not limited to a product lifecycle management, a customer acquisition workflow, an order fulfillment workflow, a product configuration workflow, a service assurance workflow, and a revenue management workflow. Accordingly, the workflow and all integrated adapters dynamically represent process management.

As identified above, the core workflow manager (1742), integration adapter (1744), integration rule manager (1746), director (1748), integration manager (1750), and adapter manager (1752), hereinafter referred to as tools, function as elements to dynamically support process management and behavior in a workflow. The tools (1742)-(1752) are shown residing in memory (1716) local to the server (1710). However, the tools (1742)-(1752) may reside as hardware tools external to the memory (1716), or they may be implemented as a combination of hardware and software. Similarly, in one embodiment, the tools (1742)-(1752) may be combined into a single functional item that incorporates the functionality of the separate items. As shown herein, each of the tools (1742)-(1752) are shown local to the server (1710). However, in one embodiment they may be collectively or individually distributed across a network or multiple machines and function as a unit to dynamically support a product management platform and associated platform behavior. Accordingly, the tools may be implemented as software tools, hardware tools, or a combination of software and hardware tools.

Figure 18:
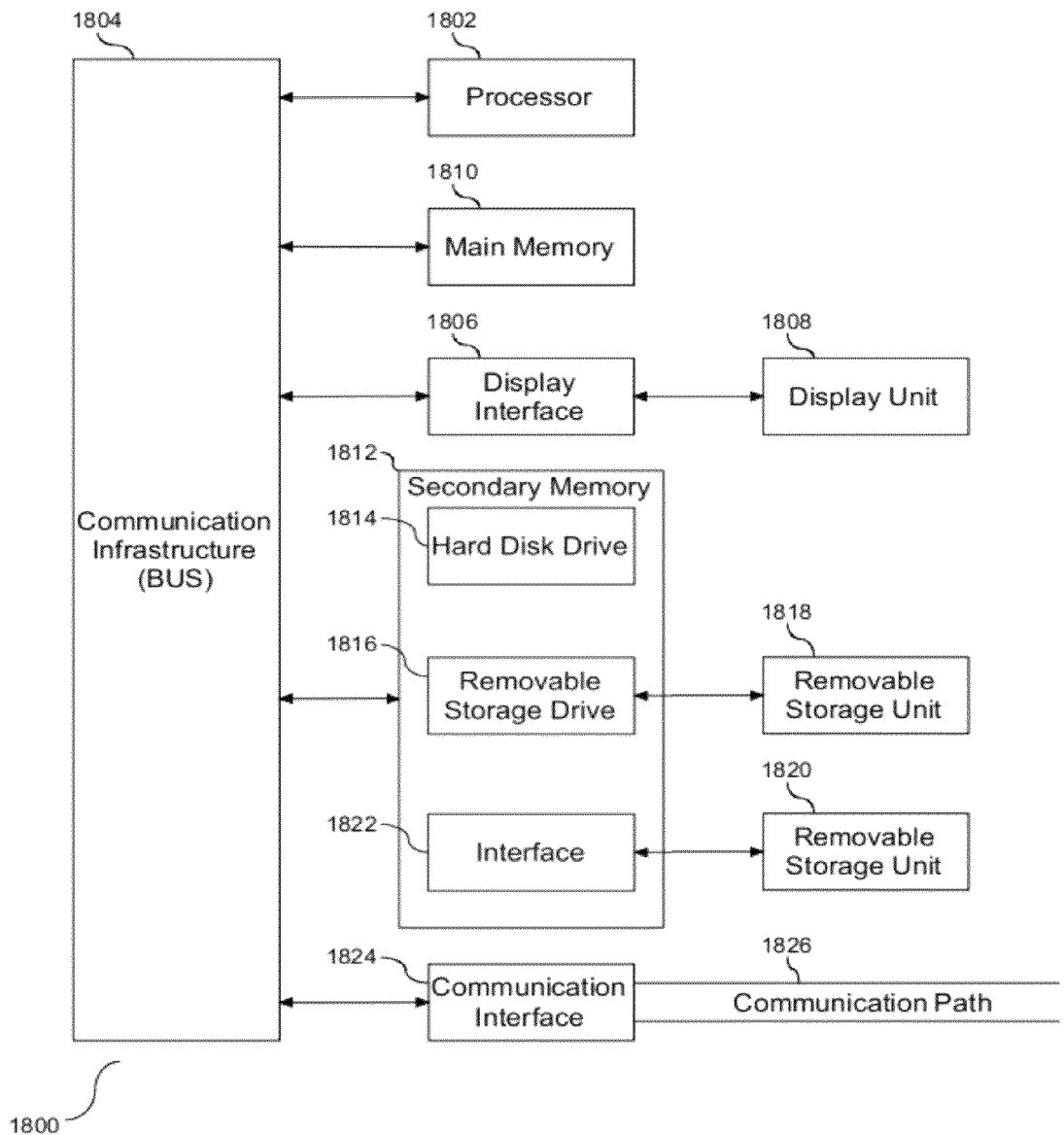
FIG. 18 is a block diagram illustrating tools embedded in a computer system to support enterprise product management.

As demonstrated in the flow charts of FIGS. 1-17, a method and system are employed to support enterprise product management. FIG. 18 is a block diagram (1800) illustrating tools embedded in a computer system to support enterprise product management. Referring now to the block diagram of FIG. 18, additional details are now described with respect to implementing an embodiment of the present invention. The computer system includes one or more processors, such as a processor (1802). The processor (1802) is connected to a communication infrastructure (1804) (e.g., a communications bus, cross-over bar, or network).

The computer system can include a display interface (1806) that forwards graphics, text, and other data from the communication infrastructure (1804) (or from a frame buffer not shown) for display on a display unit (1808). The computer system also includes a main memory (1810), preferably random access memory (RAM), and may also include a secondary memory (1812). The secondary memory (1812) may include, for example, a hard disk drive (1814) and/or a removable storage drive (1816), representing, for example, a floppy disk drive, a magnetic tape drive, or an optical disk drive. The removable storage drive (1816) reads from and/or writes to a removable storage unit (1818) in a manner well known to those having ordinary skill in the art. Removable storage unit (1818) represents, for example, a floppy disk, a compact disc, a magnetic tape, or an optical disk, etc., which is read by and written to by removable storage drive (1816). As will be appreciated, the removable storage unit (1818) includes a computer readable medium having stored therein computer software and/or data.

In alternative embodiments, the secondary memory (1812) may include other similar means for allowing computer programs or other instructions to be loaded into the computer system. Such means may include, for example, a removable storage unit (1820) and an interface (1822). Examples of such means may include a program package and package interface (such as that found in video game devices), a removable memory chip (such as an EPROM, or PROM) and associated socket, and other removable storage units (1820) and interfaces (1822) which allow software and data to be transferred from the removable storage unit (1820) to the computer system.

The computer system may also include a communications interface (1824). Communications interface (1824) allows software and data to be transferred between the computer system and external devices. Examples of communications interface (1824) may include a modem, a network interface (such as an Ethernet card), a communications port, or a PCM-CIA slot and card, etc. Software and data transferred via communications interface (1824) are in the form of signals which may be, for example, electronic, electromagnetic, optical, or other signals capable of being received by communications interface (1824). These signals are provided to communications interface (1824) via a communications path (i.e., channel) (1826). This communications path (1826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1810) and secondary memory (1812), removable storage drive (1816), and a hard disk installed in hard disk drive (1814).

Computer programs (also called computer control logic) are stored in main memory (1810) and/or secondary memory (1812). Computer programs may also be received via a communication interface (1824). Such computer programs, when run, enable the computer system to perform the features of the present invention as discussed herein. In particular, the computer programs, when run, enable the processor (1802) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. The product management platform pertains to management of an end-to-end product development process from inception through implementation, subsequent changes and eventual retirement of a product. As products are developed, different parties within an enterprise take part in the development process. For example, there are the engineers who conceive the product, a legal department who oversees different legal aspects of product development, a finance department who determines the appropriate pricing, a marketing department who determines market positioning and presentation, etc. Each of the different parties in the development process contributes to the product information. This application provides a centralized collaboration environment where all these parties can jointly work on the development of a product. More specifically, the application tracks activities of the different parties, and notifies relevant parties within the process of developments affecting only the designated parties. The notification may be based upon a user role, user group, or a specific user, etc. Accordingly, the application provides a centralized tool for different parties in different departments to work as a unit in a cohesive manner for product development. In addition, the product development process supports escalations and reminders to ensure that due dates for various activities in the process are kept on track. Accordingly, the scope of protection of this invention is limited only by the following claims and their equivalents.

We claim:

1. A product management system employing rules to drive integration, the system comprising:
   a processor in communication with memory;
   a core data model in communication with the processor, the core model having core data stored at a first location, the core model operating at a management level, the core model including one or more core product entities to provide a common view of a product in an enterprise, the view including a product specification;
   at least one model data extension entity having extension data stored at a second location, the model extension entity communicates with the core model, and supports an extended functionality of the core model while a defined functionality of the core model remains constant;
   one or more model rules, wherein each rule defines a condition under which the model extension entity integrates with the core model and customizes the product specification;
   the processor compares a condition at run-time to the one or more model rules, filters the one or more model rules meeting the condition, and establishes a relationship between the extension entity associated with the one or more filtered rules and the core model; and
   the processor creates an integrated system through integration of the model extension entity associated with the one or more filtered rules with the core model, wherein the integrated system converts to a customized product specification.

2. The system of claim 1, further comprising the processor dynamically changes an interface associated with a workflow step based upon applicability of one or more extensions as determined by the rule engine.

3. The system of claim 1, further comprising at least one option and an associated value defined within the core model and applicability of the option and any allowable value driven by at least one option rule, wherein the option rule drives dynamic behavior of experience on an interface.

4. The system of claim 1, further comprising a corresponding extension generated based on the model and an association of the corresponding extension with the core model, including identification of at least one rule under which the corresponding extension applies to the core model, wherein the at least one rule is selected from the group consisting of: a new rule and an existing rule.

5. The system of claim 1, wherein the relationship between the extension entity and the core model is stored in an element selected from the group consisting of: a relational database, an XML file, and a NoSQL database.

6. The system of claim 1, wherein at least one rule is expressed in a language selected from the group consisting of: an expression language statement and a rules engine language.

7. The system of claim 1, wherein the core model describes a customer model containing common concepts in a trade setting, the common concepts selected from the group consisting of: types of customers, relationships to customers, customer products, billing arrangements, orders, and user profiles.

8. The system of claim 7, further comprising the processor to dynamically changes an interface based upon a filtered selection of one or more preferences.

9. The system of claim 1, further comprising the processor amends metadata associated with one of the model extension entities, and reviews and certifies amended metadata prior to publication of the amended metadata on target data.

10. The system of claim 9, further comprising the processor amends new information into the integrated system, including propagation of the amended metadata to the integrated system.

11. The system of claim 1, wherein the core model represents one or more products in the enterprise.

12. The system of claim 11, further comprising the processor creating a partition to delineate access privileges to select information for a plurality of providers co-existing in a repository.

13. The system of claim 11, further comprising a multi-product bundle to combine products from separate providers, and each provider to deliver a product component of a defined bundle.

14. The system of claim 11, wherein the core model includes a data repository defining shared characteristics of two or more products, and a rule to filter a subset of characteristics from the core model to apply to a target audience.

15. The system of claim 14, wherein the rule is selected from the group consisting of: geography, privacy, channels of trade, customer profile, attributes in model extensions, and combinations thereof.

16. The system of claim 11, further comprising the core model including a catalog of product metadata to drive dynamic behavior of workflow and integration of one or more external systems through said one or more core entities and any extension entity.

17. The system of claim 16, further comprising a location manager to assess a current geographic location, and present an offer based upon the current geographic location, wherein the offer is dynamically driven by the current geographic location, offer targeting rules, and preferences.

18. The system of claim 17, further comprising an interface to present the offer, wherein the interface is selected from the group consisting of: browser based, mobile device based, and web service.

19. A computer program product comprising a computer readable tangible storage medium device having computer readable program code embodied therewith, the computer readable program code when executed on a processor causes the computer to:
   operate a core data model at a management level, the core model having core data stored at a first location, the core model including one or more core entities to provide a common view of a product in an enterprise, the view including a product specification;
   extend functionality of the core model through one or more model data extension entities having extension data stored at a second location, each model extension entity to communicate with the core model while a defined functionality of the core model remains constant;
   establish one or more rules to define a relationship between the core model and each model extension entity, wherein each rule defines a condition under which the model extension entity integrates with the core model and customizes the product specification;
   compare a condition at run-time to the one or more model rules, filter the one or more model rules meeting the condition and establish a relationship between the extension entity associated with the one or more filtered rules and the core model; and
   create an integrated system through integration of the model extension entity associated with the one or more filtered rules with the core model, wherein the integrated system converts to a customized product specification.

20. The computer program product of claim 19, further comprising program code dynamically changing an interface associated with a workflow step based upon applicability of one or more extensions.

21. The computer program product of claim 19, further comprising program code to support at least one option and an associated value defined within the core model and applicability of the option and any allowable value driven by at least one option rule, wherein the option rule drives dynamic behavior of experience on an interface.

22. The computer program product of claim 19, further comprising a program code to model the extension to generate a corresponding extension and associate the corresponding extension with the core model, including identification of at least one rule under which the corresponding extension applies to the core model, wherein the at least one rule is selected from the group consisting of: a new rule and an existing rule.

23. The computer program product of claim 19, wherein the relationship between the extension entity and the core model is stored in an element selected from the group consisting of: a relational database, an XML file, and a NoSQL database.

24. The computer program product of claim 19, wherein at least one rule is expressed in a language selected from the group consisting of: an expression language statement and a rules engine language.

25. The computer program product of claim 19, wherein the core model describes a customer model containing common concepts in a trade setting, the common concepts selected from the group consisting of: types of customers, relationships to customers, customer products, billing arrangements, orders, and user profiles.

26. The computer program product of claim 25, further comprising program code to dynamically changing an interface based upon a filtered selection of one or more preferences.

27. The computer program product of claim 19, further comprising program code to amend metadata associated with one of the model entities, and program code to review and certify amended metadata prior to publication of the amended metadata on target data.

28. The computer program product of claim 27, further comprising program code to amend new information into the integrated system, including propagation of the amended metadata to the integrated system.

29. The computer program product of claim 19, wherein the core model represents one or more products in the enterprise.

30. The computer program product of claim 29, further comprising program code to create a partition to delineate access privileges to select information for a plurality of providers co-existing in a repository.

31. The computer program product of claim 29, further comprising program code to combine products from separate providers, and each provider to deliver a product component of a defined bundle.

32. The computer program product of claim 29, wherein the core model includes a data repository defining shared characteristics of two or more products, and program code to filter a subset of characteristics from the core model to apply to a target audience.

33. The computer program product of claim 32, wherein the filter code is selected from the group consisting of: geography, privacy, channels of trade, customer profile, attributes in model extensions, and combinations thereof.

34. The computer program product of claim 29, further comprising program code to drive dynamic behavior of workflow and integration of one or more external systems through said core entity and any extension entity.

35. The computer program product of claim 34, further comprising program code to assess a current geographic location, and to present an offer to the interface based upon the current geographic location, wherein the offer is dynamically driven by the current geographic location, offer targeting rules, and user preferences.

36. The computer program product of claim 35, wherein the interface is selected from the group consisting of: browser based, mobile device based, and web service.

37. A computer implemented method comprising:
a core data model having core data stored at a first location, the core model operating at a management level and executable by a processing unit, the core model including one or more core entities to provide a common view of a product in an enterprise, the view including a product specification;
extending functionality of the core model through one or more model data extension entities having extension data stored at a second location, the model extension entity executable by the processing unit, each model extension entity communicating with the core model while a defined functionality of the core model remains constant;
establishing one or more rules, wherein each rule defines a condition under which the model extension entity integrates with the core model and customizes the product specification;
comparing a condition at run-time to the one or more model rules, filtering the one or more model rules meeting the condition, and establishing a relationship between the extension entity associated with the one or more filtered rules and the core model; and
creating an integrated system through integration of the model extension entity associated with the one or more filtered rules with the core model, wherein the integrated system converts to a customized product specification.

38. The method of claim 37, further comprising dynamically changing an interface associated with a workflow step based upon applicability of one or more extensions.

39. The method of claim 37, further comprising supporting at least one option and an associated value defined within the core model and applicability of the option and any allowable value driven by at least one option rule, wherein the option rule drives dynamic behavior.

40. The method of claim 37, further comprising generating a corresponding extension and associating the extension with the core model, including identification of at least one rule under which the corresponding extension applies to the core model, wherein the at least one rule is selected from the group consisting of: a new rule and an existing rule.

41. The method of claim 37, wherein the relationship between the extension entity and the core model is stored in an element selected from the group consisting of: a relational database, an XML file, and a NoSQL database.

42. The method of claim 37, wherein at least one rule is expressed in a language selected from the group consisting of: an expression language statement and a rules engine language.

43. The method of claim 37, wherein the core model describes a customer model containing common concepts in a trade setting, the common concepts selected from the group consisting of: types of customers, relationships to customers, customer products, billing arrangements, orders, and user profiles.

44. The method of claim 43, further comprising code dynamically changing an interface based upon a filtered selection of one or more preferences.

45. The method of claim 37, further comprising amending metadata associated with one of the model entities, and reviewing and certifying amended metadata prior to publication of the amended metadata on target data.

46. The method of claim 45, further comprising amending new information into the integrated system, including propagation of the amended metadata to the integrated system.

47. The method of claim 37, wherein the core model represents one or more products in the enterprise.

48. The method of claim 47, further comprising creating a partition to delineate access privileges to select information for a plurality of providers co-existing in a repository.

49. The method of claim 47, further comprising combining products from separate providers, and each provider to deliver a product component of a defined bundle.

50. The method of claim 47, wherein the core model includes a data repository defining shared characteristics of two or more products, and filtering a subset of characteristics from the core model to apply to a target audience.

51. The method of claim 50, wherein filtering includes a filter selected from the group consisting of: geography, privacy, channels of trade, customer profile, attributes in model extensions, and combinations thereof.

52. The method of claim 47, further comprising driving dynamic behavior of workflow and integrating of one or more external systems through said core entity and any extension entity.

53. The method of claim 52, further comprising assessing a current geographic location, and presenting an offer to the interface based upon the current geographic location, wherein the offer is dynamically driven by the current geographic location, offer targeting rules, and user preferences.

54. The method of claim 52, wherein the interface is selected from the group consisting of: browser based, mobile device based, and web service.

* * * * *